Oct. 4, 1932.  T. J. STOCKTON  1,881,249
JOINT FOR SPLIT RIMS
Filed July 31, 1931

INVENTOR
Thomas J. Stockton.
BY
Wm H Camfield.
ATTORNEY

Patented Oct. 4, 1932

1,881,249

UNITED STATES PATENT OFFICE

THOMAS J. STOCKTON, OF BELLEVILLE, NEW JERSEY

JOINT FOR SPLIT RIMS

Application filed July 31, 1931. Serial No. 554,189.

This invention relates to an improved joint for split rims of vehicles. The object of the invention is to provide a simple and cheap joint which is easily operated to allow separation of the split portion and which is easily operated to cause the jointed part of the rim to be pressed together.

Figure 1:
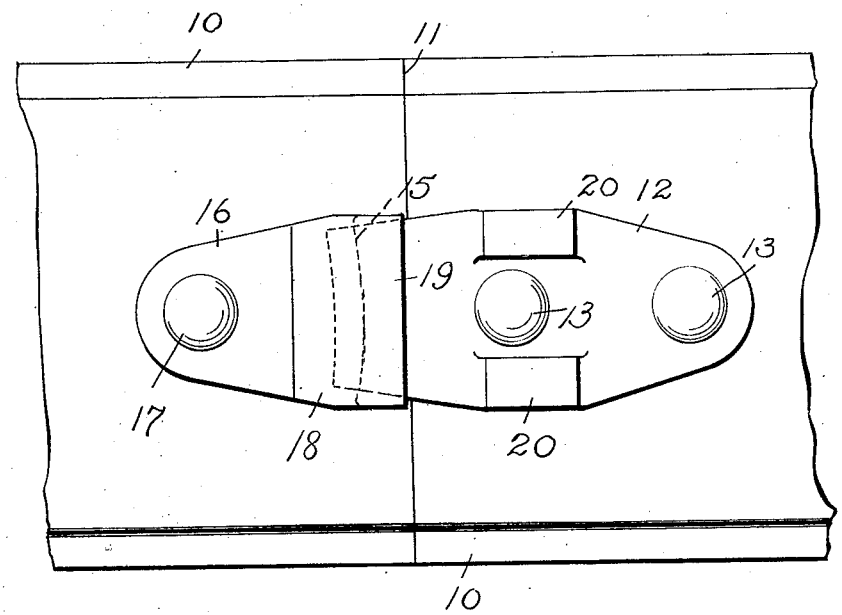
Figure 2:
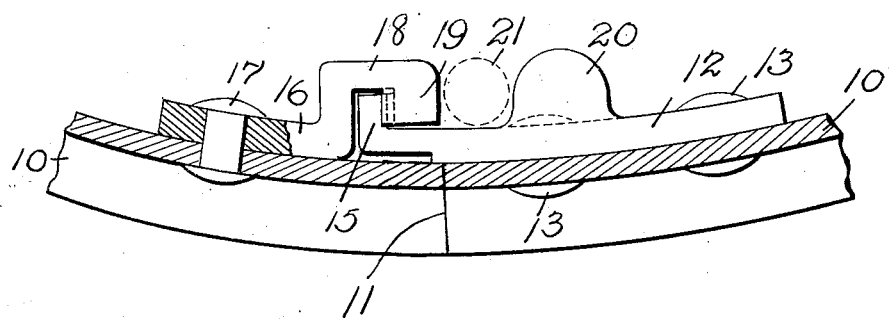

The invention is illustrated in the accompanying drawing in which Figure 1 is a plan view of a joint secured to a rim and Figure 2 is a side view of Figure 1, with the rim and part of one member of the joint shown in section.

A conventional automobile wheel rim is shown at 10 the rim being split at 11. At one side of the split portion is the member 12 fixed in position by bolts 13. The end of the member extends across the split portion and has the upturned flange 15.

The second member 16 swings laterally on the rim opposite the fixed member. The bolt 17 is shown as pivotally holding this second member so that it can be turned. The free end of the second member is turned over in a reverse trough-like end which forms a claw-like free end 18. The flange 19 at the end bears on the flange 15 of the fixed member.

To provide a proper cam action to force the split portion together at least one and preferably both of the flanges are curved.

On the fixed member are the projection or projections 20 which are spaced from the free end the proper distance to cause the flange 19 and the projections 20 to receive the cross bolt 21 of the wheel. Such cross bolts are the usual fixtures in the conventional automobile wheel and are spaced around the wheel on its inner curved portion.

The member 16 can be easily and quickly forced by tapping with a hammer over the flange 15 and rim to bring the split portion together and tapped to release it from the fixed member when the tire is to be removed.

It will be noted that the projections on the member 12 co-operate with the end of the second member 16 to form a passage or opening for the bolt 21 of the wheel thus enabling a compact joint and the bolt serves to engage the flat end of the free end 18 to hold this end against swinging and thus insuring that the member 16 will not swing out of its clamping position.

I claim:—

A joint for split rims comprising a member having a projecting end with an arcuate upturned flange, and a second member designed for lateral pivoting at one end and having a claw-like free end to engage the arcuate flange, and a projection on the first member and spaced from the said free end to form a passage between them for a transverse bolt of the wheel.

In testimony whereof he affixes his signature.

THOMAS J. STOCKTON.